United States Patent [19]

Geng et al.

[11] 3,781,819

[45] Dec. 25, 1973

[54] SHIFT UNIT FOR VARIABLE DATA WIDTHS

[75] Inventors: Hellmuth R. Geng, Schoenaich; Johann Hajdu, Boeblingen; Petar Skuin, Magstadt, all of Germany

[73] Assignee: International Business Machines Corporation, Armonk, N.Y.

[22] Filed: May 15, 1972

[21] Appl. No.: 253,084

[30] Foreign Application Priority Data

Oct. 8, 1971 Germany .................. P 21 50 291.0

[52] U.S. Cl. .............................. 340/172.5, 235/152

[51] Int. Cl. .............................................. G06f 5/00

[58] Field of Search ................. 235/152; 307/221 R; 328/37; 340/172.5

[56] References Cited

UNITED STATES PATENTS

| | | | |
|---|---|---|---|
| 3,626,376 | 12/1971 | Anderson et al. | 340/172.5 |
| 3,510,846 | 5/1970 | Goldschmidt et al. | 340/172.5 |
| 3,311,896 | 3/1967 | Delmege et al. | 340/172.5 |
| 3,596,251 | 7/1971 | Buchan et al. | 340/172.5 |

*Primary Examiner*—Eugene G. Botz
*Assistant Examiner*—James F. Gottman
*Attorney*—John C. Black et al.

[57] ABSTRACT

A circuit arrangement is provided for controlling a known logical switching network for shifting data of variable widths, wherein the shift amount by which the data bits applied to the input are to be shifted is switched from the true value to the complement value and vice versa by means of a control signal influenced by control commands, and wherein the partial results thus produced are logically combined to form a further partial result or the final result.

10 Claims, 4 Drawing Figures

PATENTED DEC 25 1973

3,781,819

SHEET 1 OF 4

SHIFT UNIT FOR VARIABLE DATA WIDTHS

BACKGROUND OF THE INVENTION

The invention relates to a circuit arrangement for shifting data of variable widths by one or several steps in one shift cycle, using a controlled logical switching network.

Shift storages and registers play an important part in information processing equipment, since circuit arrangements of this kind are capable of shifting information in at least two directions, namely, to the right and/or left and horizontally and/or vertically, respectively. For series shifting, known single- or multi-phase shift registers are best suited. By applying a phase signal, the information stored in these registers is shifted by one or several positions to the left or right. A shift register of this kind is described, for example, in the German Republic Pat. DAS 1 198 599. However, these shift registers have the disadvantage that parallel shifting of multi-position information by more than one position calls for a number of single steps and that loading has to be effected serially, so that the shifting time is a function of the number of signals necessary for shifting. Apart from this, the individual storage cells of the shift register have to consist of flip flops or multi-stable switching circuits into which information can be written and from which the stored information can be read at a certain period in time. The use of active storage cells, however, makes such shift registers very elaborate, so that they are totally unsuited for the parallel shifting of multi-position information by several positions in one cycle. The above shift registers have the further disadvantage that their individual stages have to be switched during shifting, which, in the case of high-speed shift registers, leads to the shifting time being increased by the time required for switching.

It is known to use matrixes with storage cells operating, for example, to the glow arc discharge principle for the left and right shifting of digits. In this circuit arrangement the numbers or digits are fed to the cell via lines. If one of the existing distribution lines is energized, only the glow arcs of the line of the matrix to which the distribution line is connected are permitted to fire. The voltage change of the glow arc generates a voltage pulse which is applied to the associated lines, so that the stored number is transferred to the required position. However, this arrangement, too, has the disadvantage that for shifting a number or digit the storage cell has to be fired and switched, which results in the shift cycle being extended considerably. In addition, there is the disadvantage that parallel shifting is only possible over the width for which the shift matrix is designed. Therefore, such a matrix is not suitable for shifting data of variable widths.

German Republic Pat. DAS 1 179 399 refers to a circuit arrangement for magnetic shift registers, whereby a number is shifted by the shift registers being combined to form a network in such a manner that they intersect the different coordinate systems in the individual register stages and that the controllable circuit elements provided are such that information from one register stage in a selectable coordinate system is transmitted to the subsequent stage. The network used for this purpose is designed to form a matrix with two or several coordinates. In accordance with a special embodiment of this patent, the shift registers of the lines and/or columns are connected in the form of ring registers. However, this circuit arrangement, like the former two, has the disadvantage that active storage stages have to be employed which have to be switched for shifting a number or digit applied, so that the switching time of the individual stages is added to the time required for the shift cycle.

Further, it is known to use a shift matrix consisting of N base units which are designed as read-only memories to which, in addition to the data and shift direction control lines, a base unit selector line and several control lines for indicating the shift amount are connected.

Although a permanently wired shift unit of this kind is suitable for the parallel shifting of data in one cycle, it requires elaborate technical means in relation to the capacity obtainable, for the various kinds of shift possible have to be permanently wired both to the right and to the left, while only one kind of shift and only one shift amount can be utilized during shifting. The greatest disadvantage of such an arrangement is that the width over which data can be shifted is limited, and that only data having a fixed word length can be processed.

SUMMARY OF THE INVENTION

Therefore, it is the object of the present invention to provide a shift unit for variable data widths, which permits both direct and indirect shifting to the left or right, without the width of the data to be shifted having to meet any specific requirements.

To this end the solution in accordance with the invention is characterized in that the shift amount by which the data bits applied to the input are to be shifted is switched from the true value to the complement value and vice versa by means of a control signal influenced by control commands, and that the partial results thus produced are logically combined to form a further partial result or the final result.

The solution in accordance with the invention has the advantage that by controlling the true and the complementary shift amount, the significant bits required for further processing with the next partial result are readily generated. Thus by combining the individual partial results, the shift unit is capable of shifting data whose word length exceeds the data width of the shift unit. In this manner data can be shifted at relatively high speeds, with fewer circuits than previously necessary being required.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
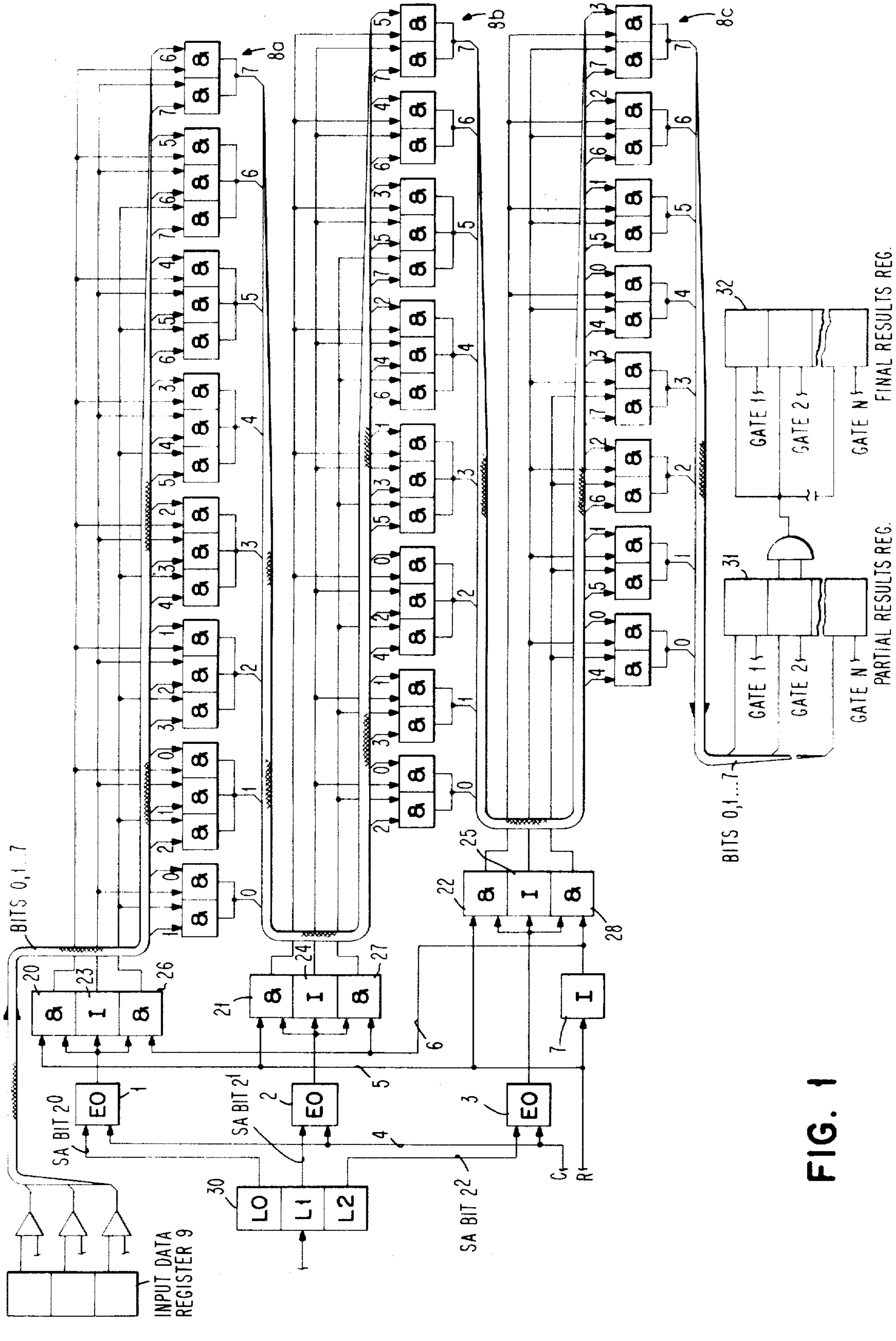
FIG. 1 illustrates one embodiment of the improved shift unit with true/complementary control of the shift amount and suitable for a data width of 1 byte.

FIG. 1 is a detailed circuit diagram of a shift unit which is designed for shifting data fields having a greater width than the width of the data flow of the shift unit. To permit larger data fields to be shifted within this shift unit, partial fields are shifted in one operation or cycle, and the partial results thus obtained are logically combined to form the final result. This entails the problem of significant bits, that means, all those bits which should be present and appear in the next partial field to be shifted, being lost during the shifting of a partial field.

Before the operation of the circuit arrangement in accordance with FIGS. 1 and 2 will be described in detail, it is explained below, by means of an auxiliary diagram, how the lost bits are retrieved in the corresponding positions.

Example 1

Characteristic values:
Data field width = 2 bytes
Shift unit width = 1 byte
Shift amount SA = 5 bits (101)
Direction of shift = left Source data 2 bytes

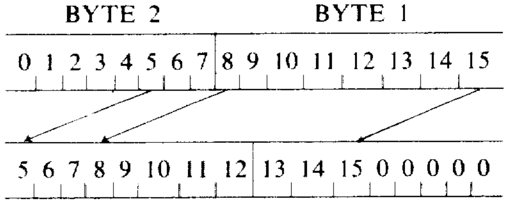

Result after shift operation, SA=5, left, 2 bytes

Shift sequence:
1. Store SA (Shift Amount) to SA register
2. Shift left byte 1 by SA = 5 (true shift amount)
Partial result 1 (TR1) 13,14,15,0,0,0,0,0
3. Shift right original byte 1 by complementary shift amount ($\overline{SA}$), by activating COMPLEMENT line (the binary complement of 101 = 010)
Partial result 2 (TR2) 0,0,8,9,10,11,12,13
4. Shift right TR2 by 1
Partial result 3 (TR3) 0,0,0,8,9,10,11,12
5. Shift left byte 2 by SA = 5
Partial result 4 (TR4) 5,6,7,0,0,0,0,0
6. OR TR3 with TR4
Partial result 5 (TR5) 5,6,7,8,9,10,11,12
7. After left shifting by SA = 5, TR5 together with TR1 represents the result.

A second example is described below, which, unlike example 1, eliminates the shifting of the partial result 2 by one position to the right.

In the second example the data width is 16 bits = 2 bytes, the data width of the shift unit 8 bits, the shift amount 3 bits, and the direction of shift "left." That means, in other words, that two bytes are to be shifted by 3 bits to the left in a shift unit having a bit width of 8.

Figure 3:
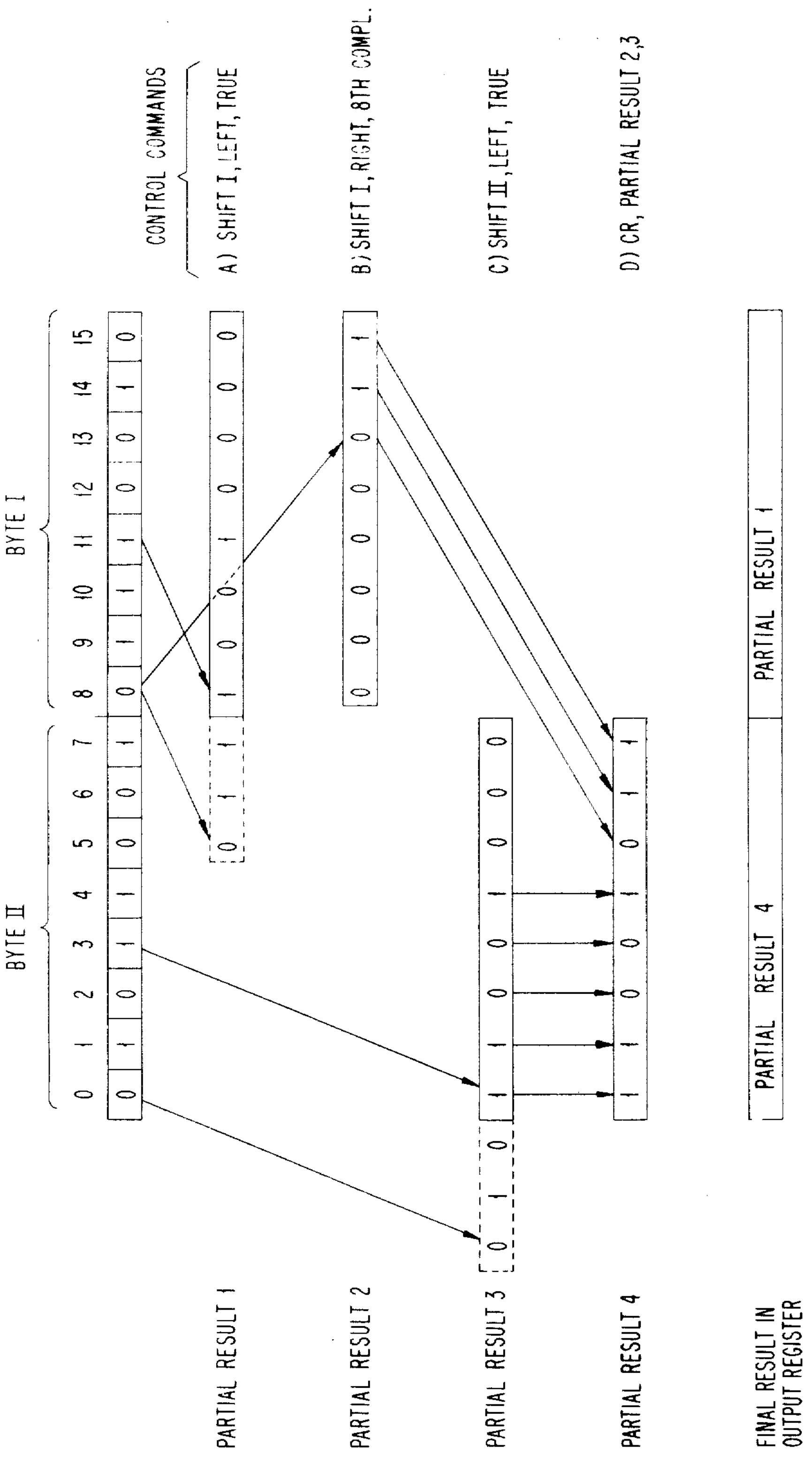
FIGS. 3 and 4 illustrate the operation of FIGS. 1 and 2 by way of examples.

The appertaining flow chart is shown in FIG. 3. The flow chart shows that four control commands *a-d* are required for shifting the two-byte data. The first command causes the first byte to be left-shifted by three positions, i.e., by the true shift amount, so yielding the partial result 1. In step *b*, byte 1 is right-shifted by the 8th complement of 3, i.e., by 5 positions, so yielding the partial result 2.

In step *c*, byte 2 is left-shifted by 3 positions, i.e., by the true shift amount, so yielding the partial result 3. Subsequently, in step *d*, the partial result 4 is formed from the partial results 2 and 3 by ORing.

With regard to step *b*, it is pointed out that the 8th complement shift to the right (i.e., in the direction reverse to the direction of shift ("left") specified by the command) results in all those bits being generated which are to enter the next partial result (3). In step *d*, in which the partial results 2 and 3 are logically ORed, the partial result 4 is formed. If the shift amount is zero and the partial result 2 is subsequently formed, an 8th complement shift amount of "eight" results. The partial result 2 of an 8th shift is a byte consisting of zero bits only, since an 8th shift leads to all significant bits to be shifted out of the shift unit.

From this the following generally applicable rules may be deduced where the width of the data flow of the shift unit is designated as *n*.

a. Shift I, left, true
b. Shift I, right, *n*th complement
c. Shift II, left, true
d. ORing of partial results 2 and 3

Figure 4:
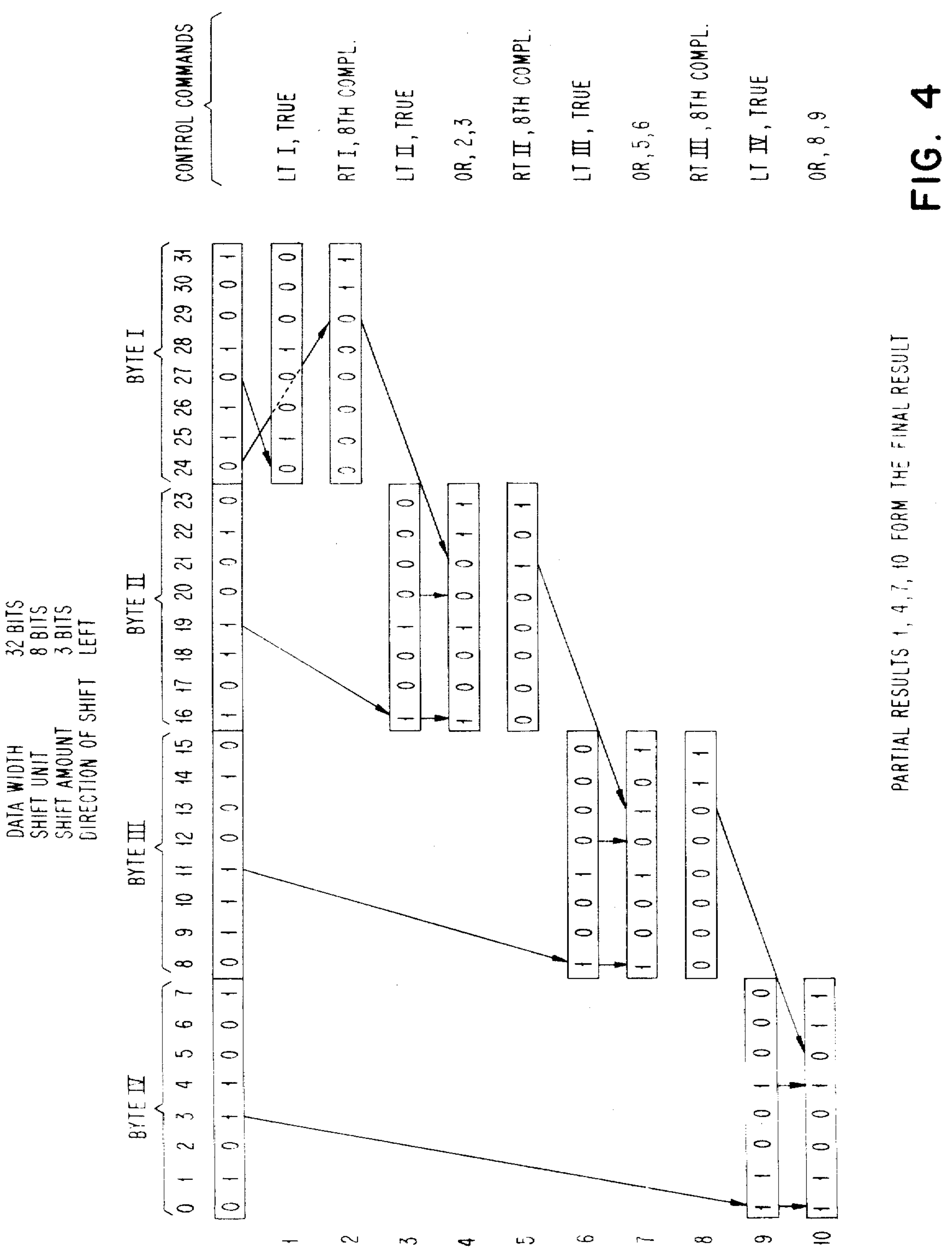

To prove that this pattern is generally applicable, an auxiliary diagram (FIG. 4) is used where the width of the data to be shifted is 32, the data width of the shift unit is 8 bits, the shift amount is 3 bits, and the direction of shift is "left."

It is self-evident from this representation that the control command sequence as indicated is generally applicable, and that the final result is derived from the partial results 1, 4, 7, and 10.

Figure 2:
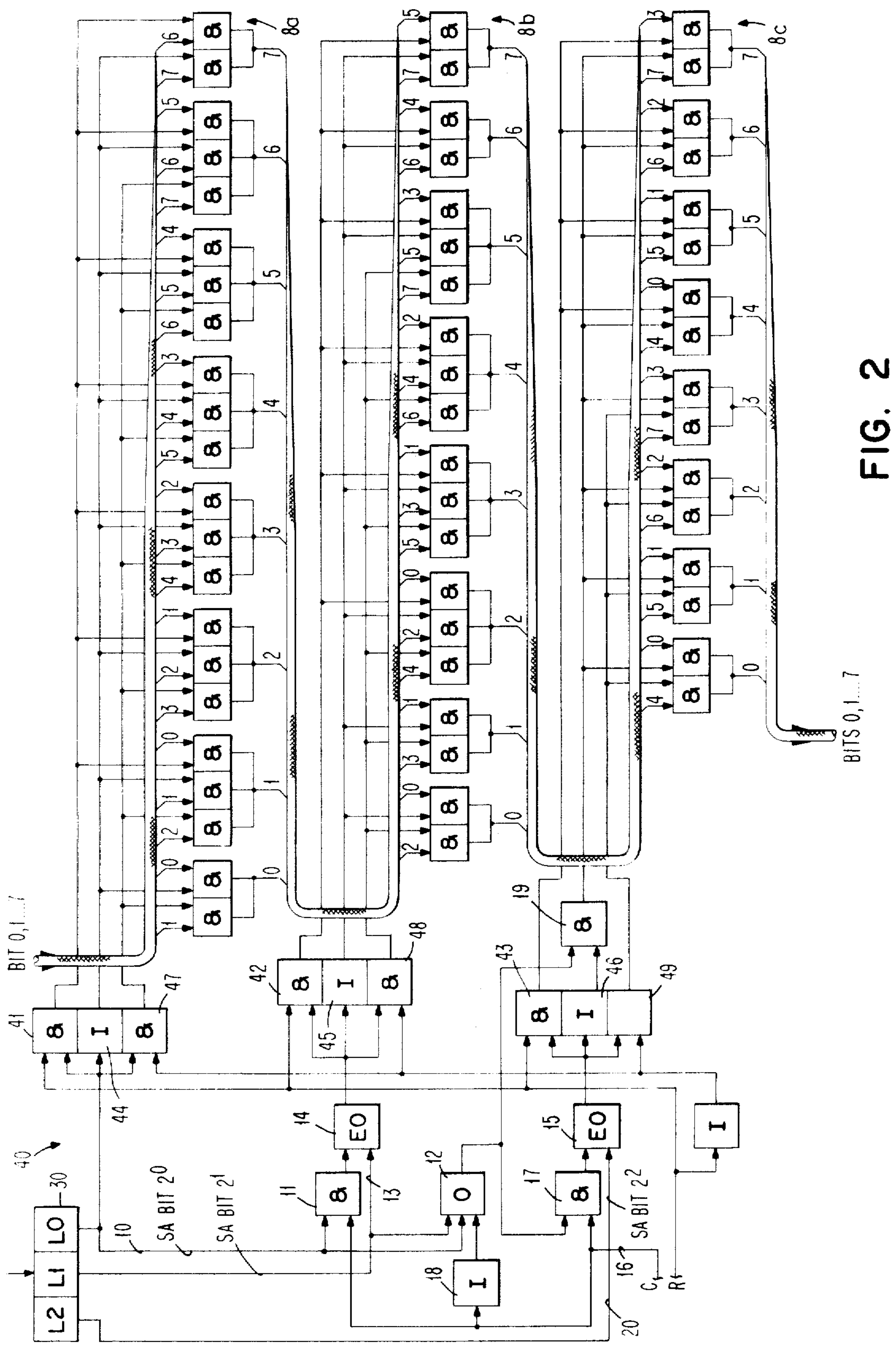
FIG. 2 shows an improved circuit arrangement in accordance with the improvement of FIG. 1, eliminating the shift by one after the complement shift as is required in accordance with FIG. 1.

FIGS. 1 and 2 show circuits which are required for shifting data in accordance with the above rules.

As will be seen from FIG. 1, the shift unit is made up of the exclusive-OR circuits 1, 2, and 3, one input of which is controlled by one bit each of the shift amount SA, and the other input of which is commonly controlled as a function of the complement control signal C via line 4. The outputs of the exclusive-OR circuits 1, 2, and 3 act on connected three-unit combine circuits consisting of AND-circuits 20–22, inverters 23–25, and further AND-circuits 26–28. The AND-circuits 20–22 are connected to line 5 receiving the right-shift signal, whereas the circuits 26–28 are linked with line 6 receiving the left-shift signal via an inverter 7. The output signals of the three-unit logical combine circuits control a known pyramid of logical AND-circuits 8*a*, 8*b*, 8*c* to whose data inputs the bits of the data to be shifted are applied from an input register 9. As a logical switching network of this type is generally known and does not form part of the subject matter of the invention, a detailed description of the individual AND-circuits has been omitted. The ordered bit positions 0–7 of each byte at the inputs and outputs of the AND circuits 8*a*, 8*b* and 8*c* are shown. As will be seen, the actual control circuit for shifting in accordance with FIG. 1 consists of three exclusive-OR circuits 1–3 to which the value or amount by which the bits applied to the data inputs is transferred via a connected register — a so-called shift amount register 30. This circuit of FIG. 1 is required for the 7th complement shift described in conjunction with example 1. Registers 31 and 32 are provided for partial and final results respectively.

A circuit arrangement 40 using the 8th complement of the shift amount SA and which thus operates at a higher speed than the shift unit shown in FIG. 1 is shown in FIG. 2.

The logical switching network to which the various data bits 0–7 are applied corresponds to that shown in FIG. 1. It will be seen in FIG. 2 that the three-unit logical combine circuits consisting of AND-circuits 41–43, inverters 44–46, and AND-circuits 47–49 for each line of the switching network are identical to that of FIG. 1. To form the binary 8th complement of a shift amount SA which is in the shift register 30, bits $2^0$, $2^1$, and $2^2$, in contrast to FIG. 1, are applied to the control circuit by exclusive-OR circuits 14 and 15 and additional logic. Via line 10, the bit having a value of $2^0$ is directly applied to the first three-unit combine circuits 41, 44, 47. In addition, this bit is fed to AND-circuit 11 in the second row and to OR-circuit 12 in the third row. The bit of the shift amount SA having a value of $2^1$ is transferred, via line 13, to exclusive-OR circuit 14 and to one input of OR-circuit 12. Via line 20, the bit of the shift amount SA having a value of $2^2$ is applied only to exclusive-OR circuit 15 in the third row. Via line 16, the complement control signal C is fed to AND-circuit 17 in the third row, to inverter 18 in the second row, and to AND-circuit 11 in the first row. Inverter 18 transfers signal C in an inverted form to OR-circuit 12. The output of AND-circuit 11 in the first row is applied to the second input of the exclusive-OR circuit in the first row. The output of OR-circuit 12 in the second row is applied to the second input of AND-circuit 17 to be combined with the shift amount bit having a value of $2^2$. The output of AND-circuit 17 is applied to the input of exclusive-OR circuit 15 in the third row.

Deviating from FIG. 1, the three-unit combine circuit 43, 46, 49 in the third line is followed in FIG. 2 by the AND-circuit 19 which is fed by the output of the inverter 46 and by the output of OR-circuit 12. In other words, the inverter 46, unlike the inverters 44, 45 does not act directly on the AND-circuits 8c.

This ensures that with a shift amount of zero when the complement function is specified, zeros are forced on the output.

A comparison of FIGS. 1 and 2 shows that the circuit arrangement for shifting in accordance with FIG. 2, although entailing a greater number of circuit means than the shift unit of FIG. 1, operates at a much higher speed than the latter, since intermediate shifting by 1 is eliminated.

By using the shift amount (CSA), the complement can be readily generated from the true shift amount by inverting each shift amount line which may be an output line of a register consisting of flip flops. Needless to say, it would also be possible to work with the binary complement of the shift amount, but in such a case, the algorithm for the shift sequence would change. This would eliminate, for example, step 4; at the same time, however, an arithmetic operation would be required for generating the binary complement of the shift amount. Which mode of operation is to be adopted for a specific application can be readily decided by those skilled in the art.

While the invention has been particularly shown and described with reference to preferred embodiments thereof, it will be understood by those skilled in the art that the foregoing and other changes in form and details may be made therein without departing from the spirit and scope of the invention.

We claim:

1. Apparatus for shifting a group of data bits of variable widths a selected number of positions X in one of two directions comprising
   - a shift path having N lines,
   - means for storing the group of data bits in an ordered sequence of sets of N bits each,
   - first logical circuits responsive to a binary value equal to X for shifting each set of N bits in the group X positions in said one direction to form a first type of partial result,
   - second logical circuits responsive to a binary value equal to the Ns complement of X for shifting in the other direction each set of N bits, except the last set in said sequence to be shifted, a number of positions equal to the Ns complement of X to form a second type of partial result, and
   - OR circuits logically combining each second type of partial result with a corresponding first type of partial result derived from the next succeeding set in said sequence to be shifted.

2. The apparatus of claim 1 wherein the shift path comprises
   - a group of logical circuit elements for each binary bit position of the value X,
   - N input and N output lines for each group,
   - each group of elements including a plurality of elements for each bit position of the path with inputs selectivley connected to the input lines for shifting input data a number of positions in either direction or not shifting; and
   - gate inputs to each element in a group responsive to said first and second logical circuits for shifting input data in one direction or the other or neither direction.

3. Apparatus for shifting a group of data bits of variable widths a selected number of positions X in one of two directions comprising
   - a shift path having N lines,
   - means for storing the group of data bits in an ordered sequence of sets of N bits each,
   - first logical circuits responsive to a binary value equal to X for shifting each set of N bits in the group X positions in said one direction to form a first type of partial result,
   - second logical circuits responsive to a binary value equal to the binary complement of X for shifting in the other direction each set of N bits, except the last set in said sequence to be shifted, a number of positions equal to the binary complement of X to form a second type of partial result,
   - logical circuits for shifting each second type of partial results one position in said other direction to form corresponding third types of partial results, and
   - OR circuits logically combining each third type of partial result with a corresponding first type of partial result derived from the next succeeding set in said sequence to be shifted.

4. The apparatus of claim 3 wherein the shift path comprises
   - a group of logical circuit elements for each binary bit position of the value X,
   - N input and N output lines for each group,
   - each group of elements including a plurality of elements for each bit position of the path with inputs selectively connected to the input lines for shifting input data a number of positions in either direction or not shifting; and gate inputs to each element in a group responsive to said logical circuits for shifting input data in one direction or the other or neither direction.

5. A method for shifting variable width data in a desired direction by way of a logical data path N bits wide and narrower than the data width, comprising the steps of arranging the data in an ordered sequence of sets of N bits each, shifting, through the path, each set of N bits of data a desired number of positions X in the desired direction to form a first type of partial result;

shifting, through the path in the opposite direction, each set of N bits of data, except the last set in the sequence to be shifted, a number of positions equal to the Ns complement of X to form a second type of partial result;

logically combining the valid data bits of each second type of partial result with the valid data bits of a corresponding first type of partial result derived from the next succeeding set in said sequence to be shifted.

6. The method of claim 5 further comprising the step of producing a final result by logically combining the logically combined valid data bits with each other and with said last set of N bits in the ordered sequence.

7. The method of claim 5 wherein the step of shifting a number of positions equal to the Ns complement of X comprises the steps of shifting, in said opposite direction, a number of positions equal to the binary complement of X, and shifting, in said opposite direction, one additional position.

8. Circuit arrangement for shifting data of variable widths by one or several bits in one shift cycle, using a controlled logical switching network having an input, said circuit arrangement comprising first means for receiving a control signal (C), second means for receiving a shift amount (SA) by which the data bits applied to the input are to be shifted, third means for switching the shift amount (SA) from the true value to the complement value and vice versa in response to said control signal (C), said switching network responsive to said true and complement values of the shift amount for shifting data applied to its input to produce partial results, and means logically combining the partial results thus produced.

9. Circuit arrangement in accordance with claim 8, wherein said third means consists of exclusive-OR circuits (1, 2, and 3), one input of which is controlled by one bit each of the shift amount (SA), the other input being commonly controlled, via a line (4), by the complement control signal (C), and the output of which acts on a connected three-unit combine circuit in one row each of the logical switching network.

10. Circuit arrangement in accordance with claim 8, wherein for generating the 8th complement of a shift amount (SA) a bit of the shift amount (SA) having a value of $2^0$ is directly applied, via a line (10), to a first three-unit control circuit, wherein this bit is additionally applied to an input of an AND-circuit (11) in a second row and to an input of an OR-circuit (12) in a third row, and wherein a bit of the shift amount (SA) having a value of $2^1$ is fed, via a line (13), to exclusive-OR circuit (14) and to a second input of OR-circuit (12), while a bit of the shift amount (SA) having a value of $2^2$ is applied to exclusive-OR circuit (15) in the third row of the combine circuit.

* * * * *